US012787914B2

(12) United States Patent
Ruia et al.

(10) Patent No.: US 12,787,914 B2
(45) Date of Patent: Nov. 10, 2026

(54) PATH-BASED MOWER DECK LIFTING

(71) Applicant: FireFly Automatix, Inc., Salt Lake City, UT (US)

(72) Inventors: Vinayak Ruia, Brooklyn, NY (US); Kyle R. Storey, Farmington, UT (US); Cody Erekson, Logan, UT (US); Eric E. Aston, Farmington, UT (US); George F. Curtis, IV, Orem, UT (US); Adam Lawrence Aposhian, Fruit Heights, UT (US); Mark C. LeBlanc, Salt Lake City, UT (US); Steven R. Aposhian, Farmington, UT (US); Korry Nielson, Logan, UT (US)

(73) Assignee: FireFly Robotics, Inc., Salt Lake City, UT (US)

( * ) Notice: Subject to any disclaimer, the term of this patent is extended or adjusted under 35 U.S.C. 154(b) by 358 days.

(21) Appl. No.: 18/584,226

(22) Filed: Feb. 22, 2024

(65) Prior Publication Data

US 2025/0268127 A1 Aug. 28, 2025

(51) Int. Cl.
*A01D 34/00* (2006.01)
*A01D 101/00* (2006.01)

(52) U.S. Cl.
CPC ........ *A01D 34/008* (2013.01); *A01D 2101/00* (2013.01)

(58) Field of Classification Search
CPC .... A01D 34/008; A01D 34/863; A01D 34/54; A01D 69/00; G05D 1/024; G05D 1/0016; G05D 1/0061; G05D 1/0219; G05D 1/0248; G05D 1/0257; G06V 10/70; G06V 20/56
See application file for complete search history.

(56) References Cited

U.S. PATENT DOCUMENTS 12,245,545 B1 * 3/2025 Blanton, Jr. ........... G05D 1/242
2023/0042867 A1 * 2/2023 Degnan ................ A01D 34/863
2025/0117019 A1 * 4/2025 Yoshikawa ............ G05D 1/435

* cited by examiner

*Primary Examiner* — Robert E Pezzuto
(74) *Attorney, Agent, or Firm* — Kirton McConkie; Brian Tucker

(57) ABSTRACT

Techniques are provided for path-based mower deck lifting. A mower can include a control system that is configured to receive path data defining a path that the mower should traverse to cut an area of grass. The path data can include lift instructions that define where within the path the mower decks should be lifted. The control system can use the path data to cause the mower to traverse the path and to predictively cause the mower decks to be lifted at the defined locations within the path.

20 Claims, 4 Drawing Sheets

PATH-BASED MOWER DECK LIFTING

CROSS-REFERENCE TO RELATED APPLICATIONS

N/A

BACKGROUND

Some mowers, such as those used to cut sod farms, golf courses, sports fields, parks, etc., have mower decks that are liftable. For example, FIG. 1, which is not prior art, shows a mower 100 which includes five liftable mower decks 110. Three mower decks 110 are positioned in front of mower 100 and two mower decks 110 are positioned under mower 100. Many other mowers include various numbers of liftable mower decks in a variety of configurations.

BRIEF SUMMARY

The present disclosure extends to techniques for path-based mower deck lifting. A mower can include a control system that is configured to receive path data defining a path that the mower should traverse to cut an area of grass. The path data can include lift instructions that define where within the path the mower decks should be lifted. The control system can use the path data to cause the mower to traverse the path and to predictively cause the mower decks to be lifted at the defined locations within the path.

In some embodiments, the path data can be processed to identify when the path includes a turn with a radius below a threshold. Lift instructions can then be automatically included in the path data to cause the mower decks to be lifted while the mower traverses the turn.

In some embodiments, the path data can be processed to identify when the path crosses a boundary. Lift instructions can then be automatically included in the path data to cause the mower decks to be lifted as they cross the boundary.

In some embodiments, the present disclosure may be implemented as a method for implementing path-based mower deck lifting. Path data that defines a path a mower should traverse to cut an area of grass can be obtained. Lift instructions can be associated with the path data to define locations within the path where one or more mower decks of the mower are to be lifted.

In some embodiments, the path data can be used to drive the mower along the path, and the one or more mower decks can be lifted in response to identifying the lift instructions associated with the path data.

In some embodiments, the lift instructions can be associated with the path data to define the locations within the path where the one or more mower decks of the mower are to be lifted by associating the lift instructions with location data defining the locations.

In some embodiments, the location data may include coordinates.

In some embodiments, the lift instructions can be associated with the path data to define the locations within the path where the one or more mower decks of the mower are to be lifted by associating the lift instructions with location data defining the locations and orientation data defining an orientation of the mower at the locations.

In some embodiments, the path data can be processed to automatically identify the locations based on a turn radius of the mower at the locations.

In some embodiments, the locations may be automatically identified based on the turn radius of the mower being below a threshold at the locations.

In some embodiments, the path data can be processed to automatically identify the locations as boundaries in the area of grass.

In some embodiments, a visual representation of the path can be presented in which portions of the visual representation of the path are customized based on the lift instructions.

In some embodiments, the lift instructions may be one or more of an instruction to lift at least one of the one or more mower decks, an instruction to partially lift at least one of the one or more mower decks, or an instruction to lower at least one of the one or more mower decks.

In some embodiments, the path data may be sequential sets of path data where each set corresponds to a particular location, and each of the lift instructions may be associated with a particular one of the sets of path data.

In some embodiments, it can be determined that a first lift instruction is associated with a first set of the sets of path data, where the first set corresponds to a first location in the path. Based on the first lift instruction, the one or more mower decks can be lifted when the mower is at the first location.

In some embodiments, the one or more mower decks can be lifted when the mower is at the first location by instructing, at a specified time prior to the mower reaching the first location, one or more actuators for the one or more mower decks to lift the one or more mower decks. The specified time may correspond to an amount of time required to cause the one or more mower decks to cease floating.

In some embodiments, the present disclosure may be implemented as a mower that includes one or more mower decks that are liftable and a control system that is configured to drive the mower along a path using path data. The control system may also be configured to lift and lower the one or more mower decks in accordance with lift instructions associated with the path data.

In some embodiments, the lift instructions may be associated with particular locations defined in the path data.

In some embodiments, the lift instructions may be associated with portions of the path data that define a beginning and an end of a turn.

In some embodiments, the lift instructions may be associated with portions of the path data that define a crossing of a boundary.

In some embodiments, the present disclosure may be implemented as computer storage media storing computer executable instructions which when executed implement a method for implementing path-based mower deck lifting. Path data defining a path that a mower is to traverse to cut an area of grass can be processed. One or more portions of the path data can be identified, where such portions of the path data define portions of the path where one or more mower decks of the mower should be lifted. Lift instructions can be associated with the one or more portions of the path data.

In some embodiments, the one or more portions of the path data that define portions of the path where the one or more mower decks of the mower should be lifted can be identified by determining that the portions of the path have a turn radius less than a threshold.

In some embodiments, the one or more portions of the path data that define portions of the path where the one or more mower decks of the mower should be lifted can be identified by determining that the portions of the path cross a boundary.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

In order to describe the manner in which the above-recited and other advantages and features can be obtained, a more particular description will be rendered by reference to specific embodiments which are illustrated in the appended drawings. These drawings depict only typical embodiments and are not therefore to be considered to be limiting.

DETAILED DESCRIPTION

Embodiments of the present disclosure may be used to enhance the functionality of any mower that is configured to traverse a predefined path to mow an area of grass. Such mowers may typically be, but need not be, fully autonomous. For example, a mower can include a control system that controls the motor or engine, the steering system, the mower deck lifting mechanisms, etc. The control system can be configured to receive path data that defines the path the mower should traverse to cut an area of grass. The control system can use the path data to cause the mower to traverse the path. In accordance with embodiments of the present disclosure, the path data can include lift instructions that define where within the path the mower decks should be lifted. The control system can detect the lift instructions as it processes the path data to predictively lift the mower decks.

In some embodiments, a path may be defined using sequential sets of path data. In some embodiments, each set of path data could include location data and orientation data. For example, in each set of path data, the location data can define a specific location of the mower and could be in the form of GPS coordinates and/or coordinates within in a frame of reference, and the orientation data can define the orientation the mower should be in at the corresponding location. In some embodiments, each set of path data could also include speed data defining a ground speed of the mower at the corresponding location. In some embodiments, a set of path data may not include orientation data and/or speed data such as when the orientation and/or speed of the mower should not change relative to a previous set of path data.

In accordance with embodiments of the present disclosure, a set of path data can include lift instructions defining whether the mower decks should be lifted when the mower is at the corresponding location. In some embodiments, each set of path data can include lift instructions. In other embodiments, lift instructions may only be included in sets of path data corresponding to locations where the lifting or lowering of the mower decks is to occur.

In some embodiments, the lift instructions may define more than two lift states. For example, the lift instructions could define lift states of "no lift," "partial lift," and "full lift," or any other combination. In some embodiments, the lift instructions may apply to each mower deck (e.g., all mower decks are lifted together and all mower decks are lowered together). In other embodiments, the lift instructions may be specific to each mower deck or groups of mower decks (e.g., lift instructions that define that the front mower decks should be lifted but the rear mower decks should not). In short, the path data can be configured in a variety of ways to associate lift instructions with specific locations in the path.

Figure 1:
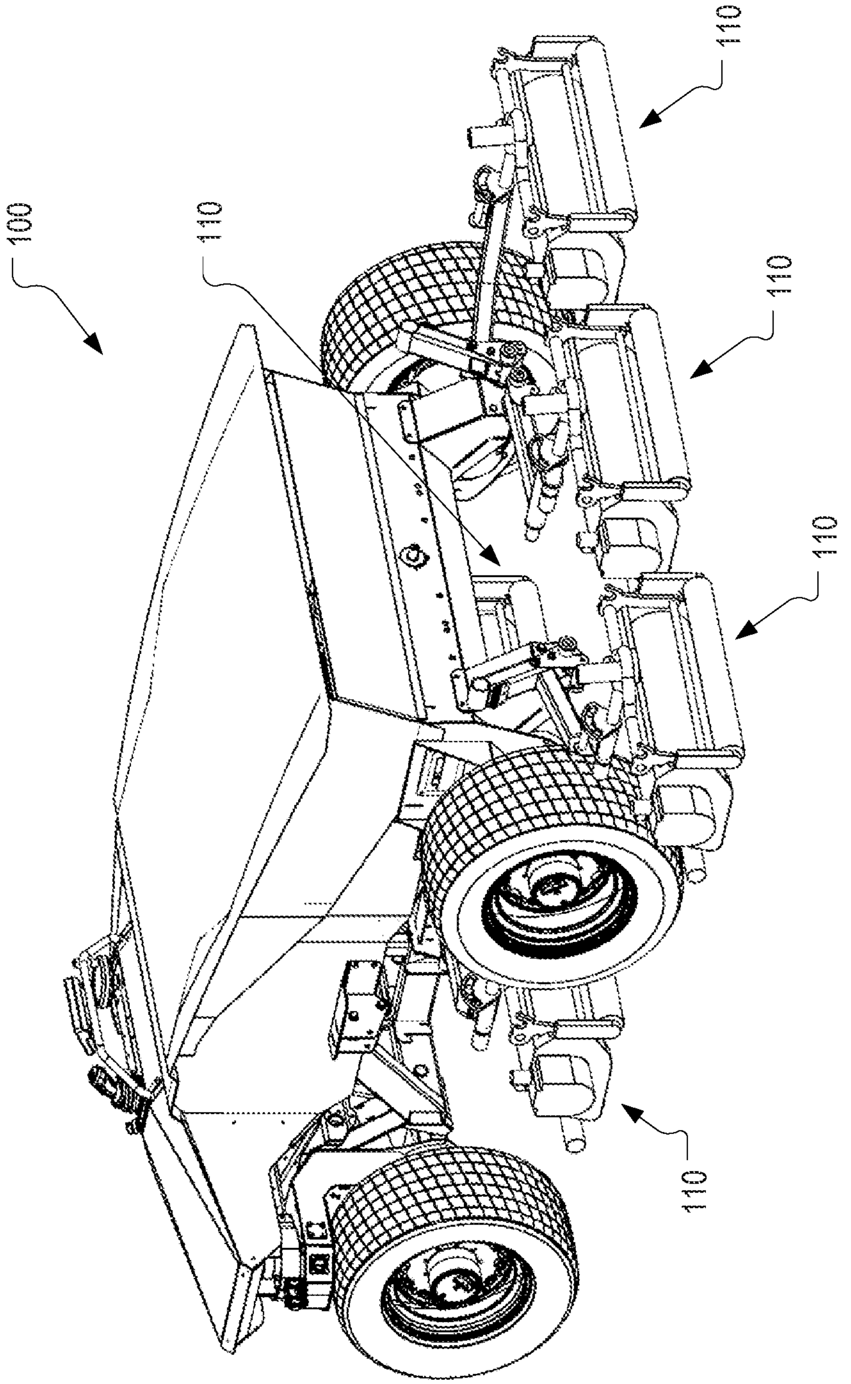
FIG. 1 illustrates an example of a mower that includes liftable mower decks.
Figure 2:
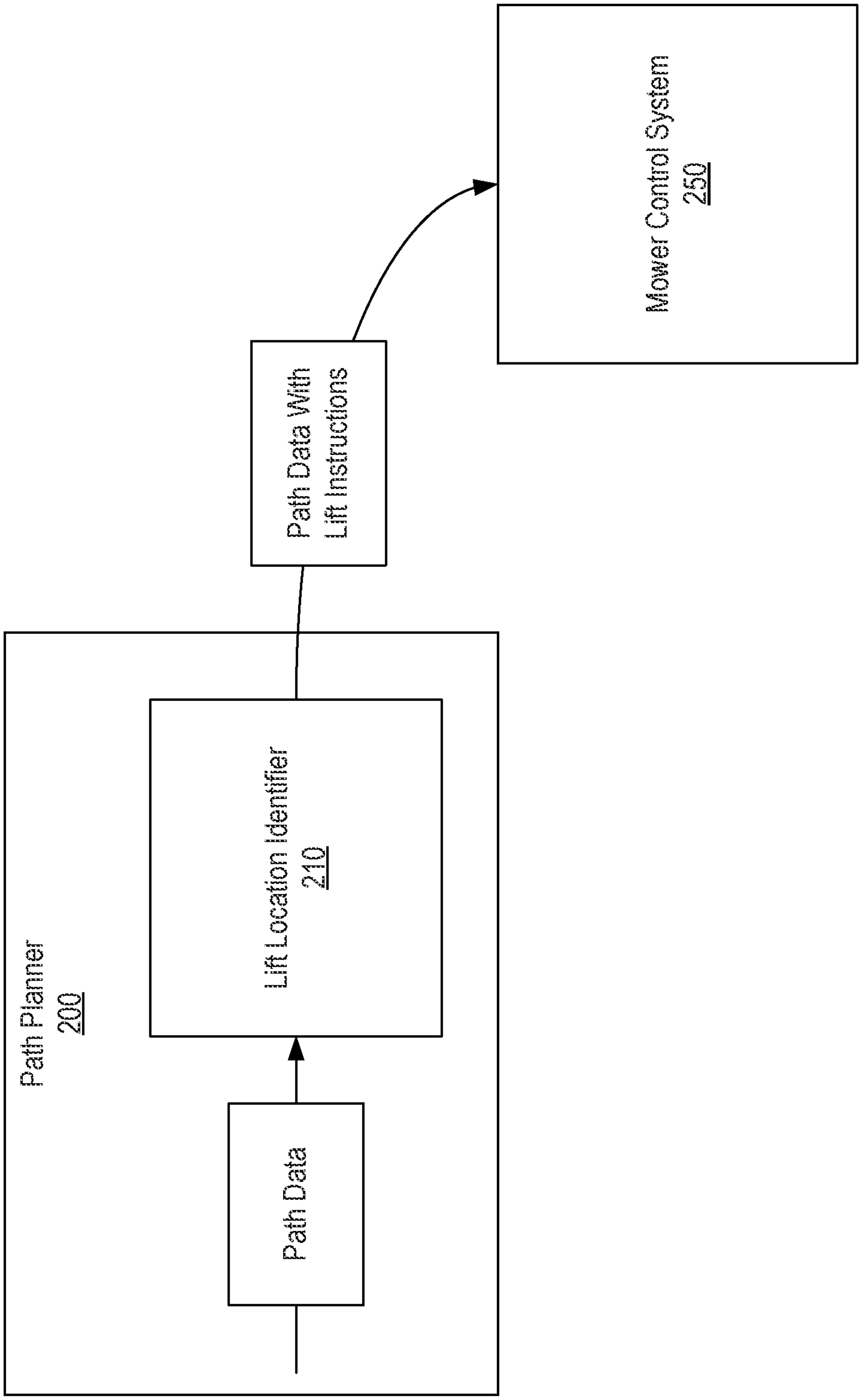
FIG. 2 provides an example of how path data with lift instructions may be generated in one or more embodiments.

FIG. 2 provides an example of how lift instructions can be automatically included in path data. In some embodiments, a path planner 200 may be used to define a path a mower should traverse to cut an area of grass. For example, path planner 200 may provide a user interface (see, e.g., FIG. 3) in which the area of grass is displayed and may provide tools for assisting the user in defining a desirable path. After/as a path is identified, path planner 200 can generate path data for a control system 250 of the mower that will traverse the path to cut the area. As stated above, the path data can be in the form of sequential sets of path data with each set corresponding to a particular location within the path.

In some embodiments, path planner 200 can include a lift location identifier 210 that is configured to process the path data to automatically identify where within the path the mower decks should be lifted and lowered. Alternatively or additionally, in some embodiments, path planner 200 could be configured to allow a user to manually specify where within the path the mower decks should be lifted and lowered. In any case, lift location identifier 210 may associate the appropriate lift instructions with the path data corresponding to locations in the path where the mower decks should be lifted or lowered.

Figure 3:
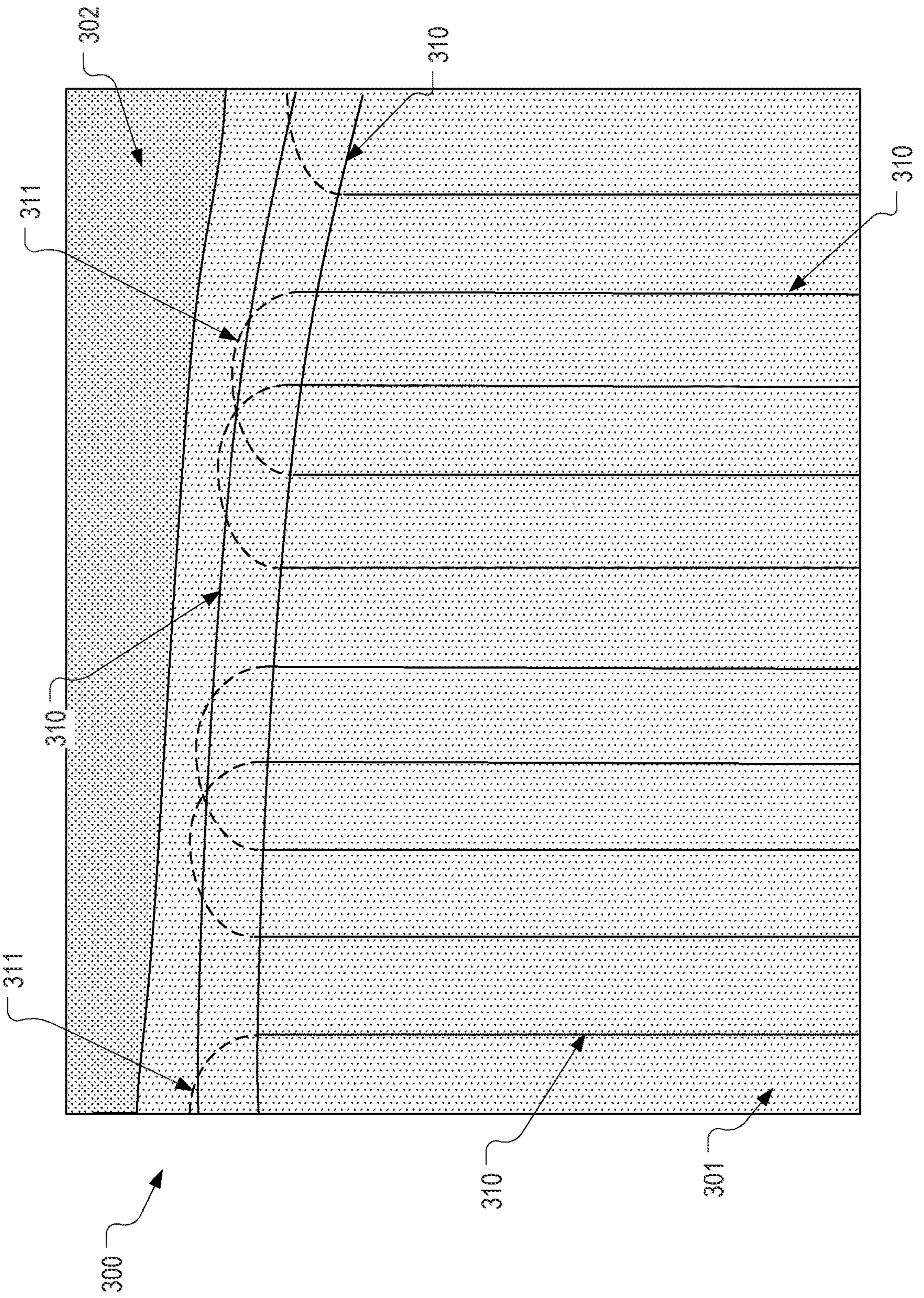
FIG. 3 provides an example of a user interface that shows a path with representations of where within the path the mower decks will be lifted.

FIG. 3 provides an example of a user interface in which a portion of an area 300 to be cut is displayed. Area 300 includes a grass section 301 and a dirt section 302. For example, area 300 could represent a sod farm. This user interface also shows a path 310 that has been defined for cutting area 300. Path 310 includes a number of sharp turns 311 which are shown in dashed lines to represent that turns 311 are portions of path 310 where the mower decks should be lifted. In other words, the user interface can be configured to detect lift instructions in the path data to determine in which portions of the path the mower decks will be lifted and can then customize the appearance of these portions to help the user visualize the areas that will not be cut due to the lifted mower decks.

As stated above, in some embodiments, turns 311 could be identified automatically by lift location identifier 210. For example, in some embodiments, lift location identifier 210 can be configured to process the path data to automatically determine where within the path the mower will be traversing a turn with a turn radius below a threshold. In some embodiments, lift location identifier 210 could identify such turns using the techniques described in U.S. patent application Ser. No. 18/411,293 which is incorporated herein by reference. Lift location identifier 210 may then associate lift instructions with the path data corresponding to the locations that the turn encompasses. For example, lift location identifier 210 may associate lift instructions for lifting the mower decks starting with the set of path data corresponding to the location where the turn begins (or where the turn radius falls below the threshold) and continuing to the set of path data corresponding to the location where the turn ends (or where the turn radius is no longer below the threshold).

In some embodiments, lift location identifier 210 can be configured to process the path data to automatically determine where within the path the mower crosses a boundary. Lift location identifier 210 may then associate lift instructions with the path data corresponding to these boundaries. For example, if the area to be cut is a fairway of a golf course and the path crosses the boundary between the fairway and the rough, lift location identifier 210 could associate lift instructions with the path data corresponding to any location where the mower crosses into the rough and any location where the mower crosses into the fairway. As another example, the boundary could be part of a pattern that is to be formed as part of cutting the grass. For example, the boundary could of a name, logo or other indicia of a sports team that is to be mowed into a field. Accordingly, a boundary can represent an existing physical boundary (e.g., fairway to rough and vice versa) or a desired boundary (e.g., the edges of any pattern that can be created by lifting and lowering the mower decks).

As shown in FIG. 2, once lift location identifier 210 has included the lift instructions in (or otherwise associated the lift instructions with) the path data, the path data can be provided to control system 250. Control system 250 can then use the path data with the lift instructions to cause the mower to traverse the path including to automatically and predictively lift and lower the mower decks as it detects the lift instructions in the path data.

Figure 4:
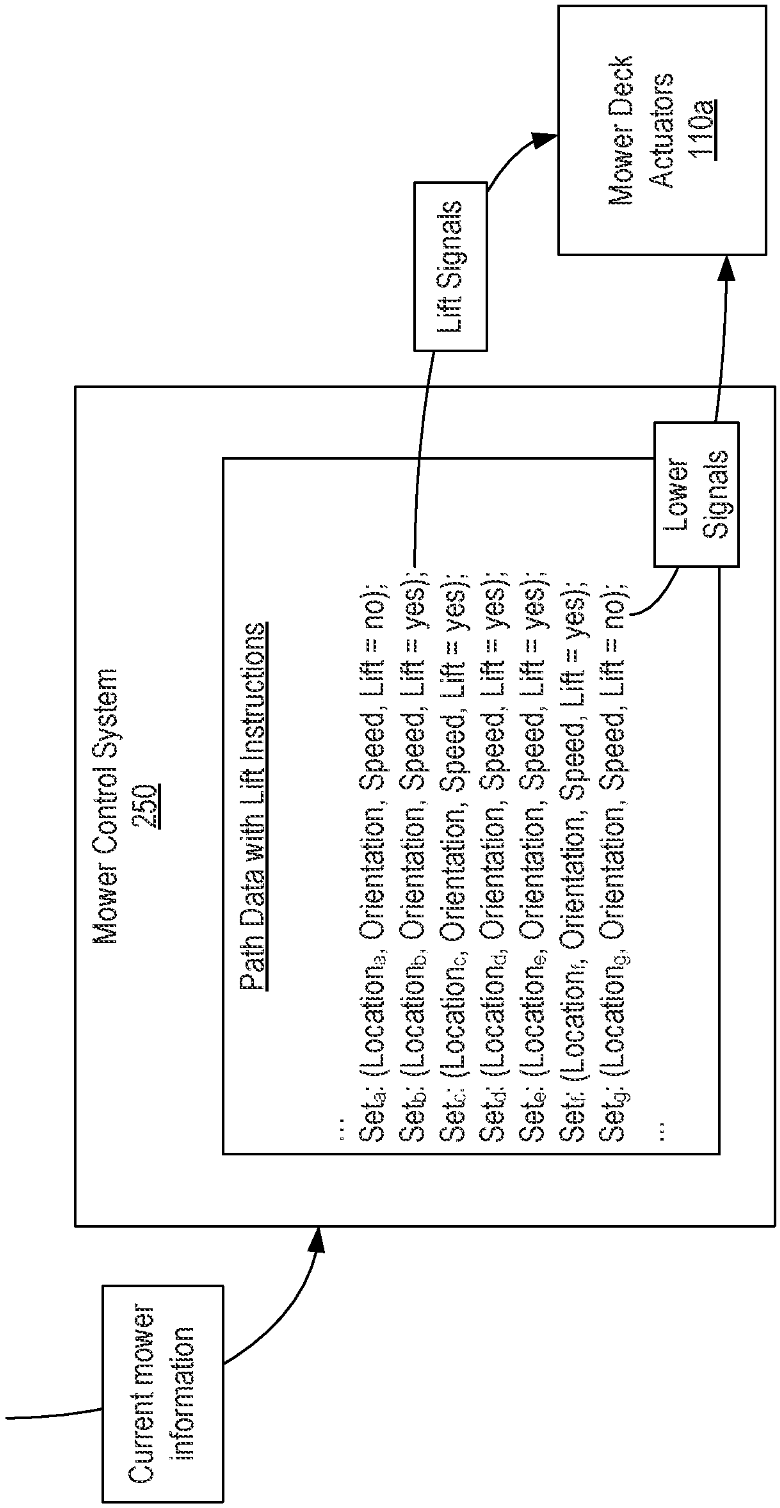
FIG. 4 provides an example of how a control system of a mower can use path data with lift instructions to automatically lift mower decks.

FIG. 4 provides an example of how control system 250 can use path data with lift instructions to cause the mower decks to be predictively lifted and lowered while traversing a path. In this example, it is assumed that the path is defined by sequential sets of path data where each set corresponds to a particular location in the area to be cut. As shown in simplified form, it is also assumed that each set of path data defines the corresponding location, the orientation of the mower at that location and the speed of the mower at that location and includes lift instructions specifying whether the mower decks should be lifted at that location.

FIG. 4 shows that the path data defines a path sequence that traverses locations a-g. Using current information about the mower (e.g., its current location, orientation, speed, etc.) and this path data, control system 250 can cause the mower to traverse this sequence of locations. As it does so, control system 250 can also determine, from the lift instructions associated with the path data, whether any of the mower decks should be lifted and possibly the extent to which each mower deck should be lifted. However, for simplicity, this example assumes that the lift instructions are a binary yes or no that applies to all mower decks.

As control system 250 processes the path data for location a, it can determine that the associated lift instructions indicate that the mower decks should not be lifted when the mower is at location a. Assuming the mower decks were not lifted before this location, control system 250 can therefore maintain the current lowered state of the mower decks. In contrast, when control system 250 processes the path data for location b, it can determine that the associated lift instructions indicate that the mower decks should be lifted when the mower is at location b. Therefore, in conjunction with causing the mower to travel to location b, possibly while also causing the mower to turn to the specified orientation and/or change speed, control system 250 can also instruct the mower deck actuators 110*a* to lift the mower decks.

Control system 250 may continue to drive the mower along the path in accordance with the path data for locations c-f including keeping the mower decks lifted. Then, upon processing the path data for location g, control system 250 can cause the mower decks to be lowered in conjunction with driving the mower to location g. As can be seen, because the lift instructions are integrated into the path data, control system 250 does not need to perform any calculations on the mower to determine when to lift or lower the mower decks. Instead, control system 250 simply needs to follow the lift instructions.

In some embodiments, control system 250 may be configured to account for a delay between the time that the mower deck actuators 110*a* are driven and the time the mower decks are actually lifted or lowered. For example, if the mower decks will not be lifted until one second after control system 250 instructs mower deck actuators 110*a* to lift them, control system 250 may employ the path data associated with the lift instructions and/or the current mower information to calculate exactly when to instruct mower deck actuators 110*a*. In the context of FIG. 4, control system 250 could determine that the lift signals should be provided to mower deck actuators 110*a* when the mower is one second away from reaching location b (e.g., based on a prior calibration) and could use the current mower location and the location b and associated speed defined in the path data to calculate the timing for the lift signals.

In some embodiments, control system 250 could be configured to use a two-step process for lifting the mower decks. For example, control system 250 may be calibrated to know the amount of slack in mower deck actuators 110*a* when the mower decks are floating. Then, in conjunction with detecting lift instructions in the path data, control system 250 could initially instruct mower deck actuators 110*a* to remove the slack before reaching the location where lift should occur and subsequently instruct mower deck actuators 110*a* to lift the mower decks once reaching the location where the lift should occur. In such cases, and because the slack is removed, the mower decks can be immediately lifted in response to control system 250's instructions.

In summary, embodiments of the present disclosure allow lift instructions to be integrated into the path data that a mower's control system uses to drive a mower along a path. By integrating the lift instructions into the path data, the control system can predictively lift the mower decks at desired locations within the path.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The present invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method for implementing path-based mower deck lifting, the method comprising:
- obtaining path data that defines a path a mower should traverse to cut an area of grass;
- associating lift instructions with the path data to define locations within the path where one or more mower decks of the mower are to be lifted, wherein the path data comprises a plurality of sequential sets of path data, each set of the plurality of sequential sets of path data corresponding to a particular location in the path and including location data defining the particular location, and wherein associating the lift instructions with the path data comprises including a lift instruction in at least one set of the plurality of sequential sets of path data so that the lift instruction is directly associated with the location data of the at least one set and defines whether the one or more mower decks are to be lifted when the mower is at the particular location corresponding to the at least one set;
- using the path data to drive the mower along the path; and
- causing the one or more mower decks to be lifted in response to identifying, while processing the plurality of sequential sets of path data, the lift instruction included in the at least one set.

2. The method of claim 1, wherein causing the one or more mower decks to be lifted comprises sending one or more lift signals to one or more mower deck actuators in response to identifying the lift instruction included in the at least one set.

3. The method of claim 1, wherein associating the lift instructions with the path data to define the locations within the path where the one or more mower decks of the mower are to be lifted comprises associating the lift instructions with location data defining the locations.

4. The method of claim 3, wherein the location data comprises coordinates.

5. The method of claim 1, wherein associating the lift instructions with the path data to define the locations within the path where the one or more mower decks of the mower are to be lifted comprises associating the lift instructions with location data defining the locations and orientation data defining an orientation of the mower at the locations.

6. The method of claim 1, further comprising:
- processing the path data to automatically identify the locations based on a turn radius of the mower at the locations.

7. The method of claim 6, wherein the locations are automatically identified based on the turn radius of the mower being below a threshold at the locations.

8. The method of claim 1, further comprising:
- processing the path data to automatically identify the locations as boundaries in the area of grass.

9. The method of claim 1, further comprising:
- presenting a visual representation of the path, including customizing portions of the visual representation of the path based on the lift instructions.

10. The method of claim 1, wherein the lift instructions comprise one or more of an instruction to lift at least one of the one or more mower decks, an instruction to partially lift at least one of the one or more mower decks, or an instruction to lower at least one of the one or more mower decks.

11. The method of claim 1, wherein each set of the plurality of sequential sets of path data includes a respective lift instruction that defines whether the one or more mower decks are to be lifted when the mower is at the particular location corresponding to the set.

12. The method of claim 11, further comprising:
- determining that a first lift instruction is associated with a first set of the sets of path data, the first set corresponding to a first location in the path; and
- based on the first lift instruction, causing the one or more mower decks to be lifted when the mower is at the first location.

13. The method of claim 12, wherein causing the one or more mower decks to be lifted when the mower is at the first location comprises, at a specified time prior to the mower reaching the first location, instructing one or more actuators for the one or more mower decks to lift the one or more mower decks, the specified time corresponding to an amount of time required to cause the one or more mower decks to cease floating.

14. A mower comprising:
- one or more mower decks that are liftable; and
- a control system that is configured to drive the mower along a path using path data, the path data comprising a plurality of sequential sets of path data, each set of the plurality of sequential sets of path data corresponding to a particular location in the path and including location data defining the particular location, at least one set of the plurality of sequential sets of path data including a lift instruction directly associated with the location data of the at least one set and defining whether the one or more mower decks are to be lifted when the mower is at the particular location corresponding to the at least one set, the control system also being configured to lift and lower the one or more mower decks in accordance with one or more lift instructions associated with the path data, including by lifting the one or more mower decks in response to identifying, while processing the plurality of sequential sets of path data, that the lift instruction included in the at least one set indicates that the one or more mower decks are to be lifted.

15. The mower of claim 14, wherein the location data comprises coordinates.

16. The mower of claim 14, wherein the lift instructions are associated with portions of the path data that define a beginning and an end of a turn.

17. The mower of claim 14, wherein the lift instructions are associated with portions of the path data that define a crossing of a boundary.

18. One or more non-transitory computer storage media storing computer executable instructions which when executed implement a method for implementing path-based mower deck lifting, the method comprising:

processing path data defining a path that a mower is to traverse to cut an area of grass, the path data comprising a plurality of sequential sets of path data, each set of the plurality of sequential sets of path data corresponding to a particular location in the path and including location data defining the particular location;

identifying one or more portions of the path data that define portions of the path where one or more mower decks of the mower should be lifted;

associating lift instructions with the one or more portions of the path data by including a lift instruction in at least one set of the plurality of sequential sets of path data so that the lift instruction is directly associated with the location data of the at least one set and defines whether the one or more mower decks are to be lifted when the mower is at the particular location corresponding to the at least one set; and causing the one or more mower decks to be lifted in response to identifying, while the mower is driven along the path using the path data, the lift instruction included in the at least one set.

19. The computer storage media of claim 18, wherein identifying the one or more portions of the path data that define portions of the path where the one or more mower decks of the mower should be lifted comprises determining that the portions of the path have a turn radius less than a threshold.

20. The computer storage media of claim 18, wherein identifying the one or more portions of the path data that define portions of the path where the one or more mower decks of the mower should be lifted comprises determining that the portions of the path cross a boundary.

* * * * *